United States Patent
Uskert et al.

(10) Patent No.: US 9,739,157 B2
(45) Date of Patent: Aug. 22, 2017

(54) COOLED CERAMIC MATRIX COMPOSITE AIRFOIL

(71) Applicant: Rolls-Royce Corporation, Indinapolis, IN (US)

(72) Inventors: Richard C. Uskert, Timonium, MD (US); Aaron D. Sippel, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 656 days.

(21) Appl. No.: 14/097,844

(22) Filed: Dec. 5, 2013

(65) Prior Publication Data

US 2014/0271153 A1    Sep. 18, 2014

Related U.S. Application Data

(60) Provisional application No. 61/778,359, filed on Mar. 12, 2013.

(51) Int. Cl.
| | | |
|---|---|---|
| *F01D 5/18* | (2006.01) | |
| *F01D 5/28* | (2006.01) | |
| *F01D 9/06* | (2006.01) | |

(52) U.S. Cl.
CPC ............ *F01D 5/282* (2013.01); *F01D 5/18* (2013.01); *F01D 5/187* (2013.01); *F01D 5/284* (2013.01); *F01D 9/065* (2013.01); *F01D 5/288* (2013.01); *F05D 2240/81* (2013.01); *F05D 2260/202* (2013.01); *F05D 2300/6033* (2013.01); *F05D 2300/612* (2013.01); *Y10T 29/49229* (2015.01)

(58) Field of Classification Search
CPC .......... F01D 5/187; F01D 5/186; F01D 5/282; F01D 5/284; F01D 9/065
See application file for complete search history.

(56) References Cited

U.S. PATENT DOCUMENTS

| | | | |
|---|---|---|---|
| 4,285,634 A * | 8/1981 | Rossman | F01D 5/284 416/241 B |
| 4,314,794 A | 2/1982 | Holden | |
| 4,422,229 A | 12/1983 | Sadler et al. | |
| 6,514,046 B1 | 2/2003 | Morrison et al. | |
| 6,648,596 B1 | 11/2003 | Grylls et al. | |
| 6,709,230 B2 * | 3/2004 | Morrison | F01D 5/189 415/115 |
| 6,887,044 B2 | 5/2005 | Fleck et al. | |
| 7,229,254 B2 | 6/2007 | Bast et al. | |
| 7,255,535 B2 * | 8/2007 | Albrecht | F01D 5/147 416/229 R |
| 7,481,621 B2 | 1/2009 | Campbell et al. | |

(Continued)

FOREIGN PATENT DOCUMENTS

EP    1475567 A1    11/2004

OTHER PUBLICATIONS

International Search Report for PCT International Application Serial No. PCT/US2013/073267, completed Jul. 24, 2014, (12 pages).

*Primary Examiner* — Justin Seabe
(74) *Attorney, Agent, or Firm* — Barnes & Thornburg LLP

(57) ABSTRACT

One aspect of the present disclosure includes a ceramic matrix composite airfoil having a shaped ceramic matrix composite core, a cooling fluid flow network having ceramic foam components, and a ceramic lamina skin disposed about the shaped core and the cooling fluid flow network.

17 Claims, 6 Drawing Sheets

(56) References Cited

U.S. PATENT DOCUMENTS

| | | |
|---|---|---|
| 7,563,504 B2 | 7/2009 | Mazzola et al. |
| 7,641,440 B2 * | 1/2010 | Morrison ................ F01D 5/187 |
| | | 415/116 |
| 2005/0111966 A1 * | 5/2005 | Metheny ................ F01D 5/183 |
| | | 415/116 |
| 2005/0249602 A1 | 11/2005 | Freling et al. |
| 2010/0068034 A1 | 3/2010 | Schiavo et al. |
| 2011/0027098 A1 | 2/2011 | Noe et al. |

* cited by examiner

COOLED CERAMIC MATRIX COMPOSITE AIRFOIL

CROSS REFERENCE TO RELATED APPLICATIONS

This application claims priority to and the benefit of U.S. Provisional Patent Application No. 61/778,359, filed 12 Mar. 2013, the disclosure of which is now expressly incorporated herein by reference.

TECHNICAL FIELD

The present disclosure generally relates to gas turbine engines, and more particularly, but not exclusively, to cooled ceramic matrix composite airfoils.

BACKGROUND

Present approaches to cooling ceramic matrix composite components in high temperature and high pressure environments suffer from a variety of drawbacks, limitations, and disadvantages. There is a need for the unique and inventive ceramic matrix composite components, apparatuses, systems and methods disclosed herein.

SUMMARY

One embodiment of the present disclosure is a unique ceramic matrix composite component, such as an airfoil operable within a gas turbine engine. Other embodiments include methods for constructing the aforementioned airfoil. Further embodiments, forms, features, aspects, benefits, and advantages of the present disclosure shall become apparent from the description and figures provided herewith.

DETAILED DESCRIPTION OF THE ILLUSTRATIVE EMBODIMENTS

Figure 1:
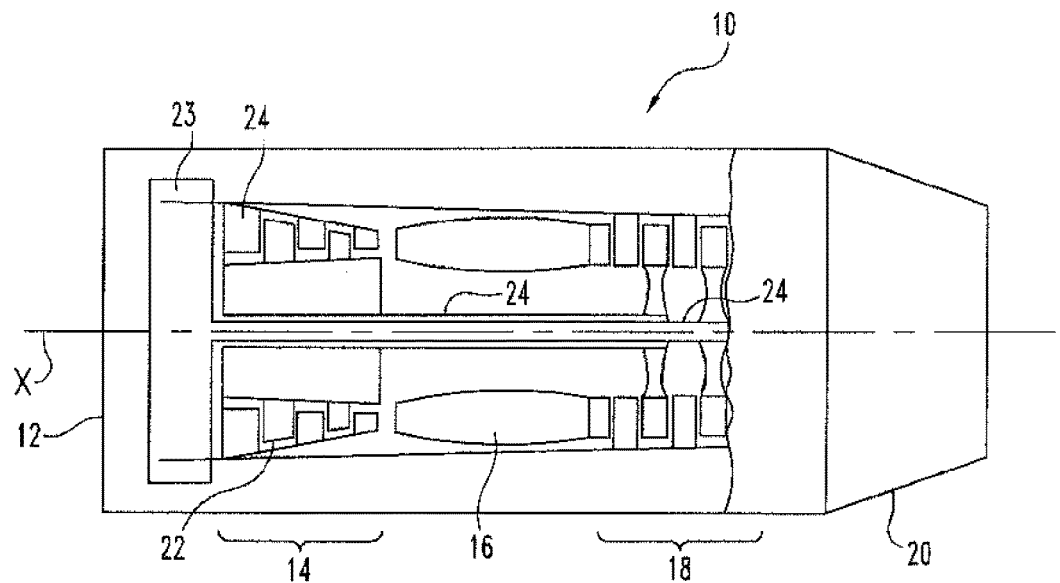
FIG. 1 is a cross-sectional schematic view of a gas turbine engine.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates.

Referring to FIG. 1, a schematic view of a gas turbine engine 10 is depicted. While the gas turbine engine is illustrated with two spools (i.e. two shafts connecting a turbine and a compressor and a fan), it should be understood that the present disclosure is not limited to any particular engine design or configuration and as such may be used in single or multi spool engines of the aero or power generation type. The gas turbine engine will be described generally, however significant details regarding general gas turbine engines will not be presented herein as it is believed that the theory of operation and general parameters of gas turbine engines are well known to those of ordinary skill in the art. While the ceramic matrix composite component defined in the present disclosure is applicable to gas turbine engines, it should be understood the ceramic matrix composite component can be used in any system having high temperature fluid flow paths.

The gas turbine engine 10 includes an inlet section 12, a compressor section 14, a combustor section 16, a turbine section 18, and an exhaust section 20. In operation, air is drawn in through the inlet 12 and compressed in the compressor section 14 to a high pressure relative to ambient pressure of the gas turbine engine 10. The compression section 14 includes plurality of stages with rotating blades 22 that operate to compress working fluid and vanes 24 positioned upstream of a rotating blade 22 to control aerodynamic properties of the working fluid entering into the rotating stage.

The compressed air is mixed with fuel in the combustor section 16 wherein the fuel/air mixture burns and produces a high temperature and pressure working fluid from which the turbine section 18 extracts power. The turbine section 18 is mechanically coupled to the compressor section 14 via a shaft 21, which rotates about a centerline axis X that extends axially along the longitudinal axis of the engine 10. As the turbine section 18 rotates due to the forces generated by the high pressure working fluid, the compressor section 14 is rotatingly driven by the turbine section 18 via the shaft 21 to produce compressed air. A portion of the power extracted from the turbine section 18 can be utilized to drive a second device 23 through a second shaft 25, such as a fan, an electrical generator, gas compressor or pump and the like.

Many components utilized within a gas turbine engine may be made of a ceramic matrix composite ("CMC") material construction, as they are suitable for operational use in the high pressure and high temperature internal operating environment of a gas turbine engine. CMCs will be described generally, however significant details regarding CMC formation and manufacture will not be presented as it is believed that the general aspects of CMC manufacturing are well known to those of ordinary skill in the art. It is appreciated that while general aspects of CMC manufacturing are disclosed in the present disclosure, many variations in the processes and materials used are envisioned in the present disclosure and no limitation of the scope of the disclosure is thereby intended.

CMCs can be made from a lay-up of a plurality of fibers and formed to a desired shape. At this stage the CMC is generally known as a fiber preform or preform. The preform may also be, for example, made of filament windings, braiding, and knotting of fibers, as well as made of two-dimensional and three-dimensional fabrics, unidirectional fabrics, and non-woven textiles. The fibers used in the preform may be, for example, any number of the following materials: ceramic fibers, organic fibers, metallic fibers, and glass fibers.

The preform may further be infiltrated with a matrix material. The matrix may be, for example, made of any number of the following materials: polymers, metals, and ceramics, such as silicon carbide, and silicon/silicon carbide. The preform may be, for example, infiltrated by the matrix by any number of the following processes: Deposition from a gas phase, such as chemical vapor deposition or chemical vapor infiltration, pyrolysis, chemical reaction, sintering, and electrophoresis. Finally, the part may be machined, if necessary to bring the part geometry into the required specifications.

Ceramic foams are defined by an open-celled structure that looks similar to a sponge and is made from an interconnecting lattice of ceramic. This structure can have a regular and repetitive pattern which gives the foam material equal strength and performance throughout the structure. The open cell structure is lightweight but has a high strength to weight ratio. In addition, the properties of ceramic foam material can be designed to maximize thermal shock resistance, increase or decrease thermal conductivity, and generally provide high temperature capability operation. Ceramic foams can be 75 to 90% porous, although some are even more porous. Ceramic foams defined by the present disclosure can include a variety of ceramic materials and processing methods, and is not limited by any particular material composition or processing method illustrated as an exemplary embodiment. The ceramic foam of the present disclosure is operable to provide a flow path that distributes cooling fluid throughout the ceramic foam space. The ceramic foam can be designed to maximize surface area for increased heat transfer, minimizing pressure drop of the fluid flow and maintain adequate structural stiffness and strength of the component.

Figure 2:
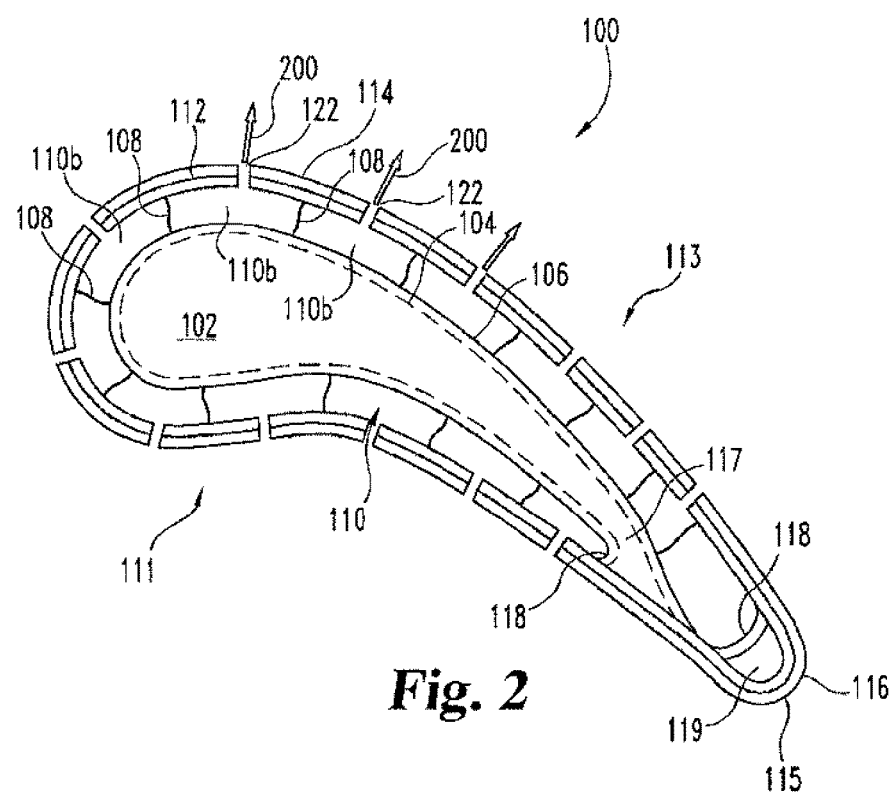
FIGS. 2 and 3 are cross-sectional views of airfoils according to alternate embodiments of the present disclosure.

With reference to FIG. 2, a cross section an airfoil 100 according to one exemplary embodiment of the present disclosure is illustrated. In one form the airfoil 100 can be disposed within a gas turbine engine. The airfoil 100 may be made from a ceramic matrix composite including a shaped laminate preform core 102 made of, for example, core tape 104 and core wrap 106. A cooling fluid flow network 110 can be defined to provide a cooling fluid to cool the airfoil 100. The cooling fluid flow network 110 can include one or more ceramic foam components 110a (not shown in FIG. 2) and 110b. The ceramic foam components 110b can be disposed about the preform core 102 of the airfoil 100.

A plurality of separators 108 can be positioned at predefined locations around and between ceramic foam components 110a and 110b to prevent fluid flow in undesired locations. The separators 108 can be made from one or more dense CMC plies that restrict fluid from passing therethrough.

A lamina airfoil skin 112 of a ceramic fiber fabric is disposed about the ceramic foam components 110b to provide the pressure side aerodynamic surface 111 and the suction side aerodynamic surface 113 of the airfoil 100. In one form, the lamina airfoil skin 112 can be formed of a single ceramic composite layer. Using a single ceramic composite layer can eliminate the stress formed between multiple layers in a multilayer lamina airfoil skin 112 construction. The airfoil skin 112 may include a single piece that spans both the pressure and suction sides 111, 113, respectively of the airfoil 100. A coating 114 may be applied to the outer single layer lamina airfoil skin 112. The coating 114 can include a thermal barrier coating to reduce heat transfer into the airfoil 100 and/or an environmental barrier coating to resist corrosion of the airfoil 100.

The airfoil skin 112 may be made of, for example, glass, carbon, aramid, ceramic oxide, ceramic nitride, ceramic carbide, or a combination thereof. The skin 112 may be split at the trailing edge 115 of the airfoil 100 such that some percentage of fibers may be wrapped, creating a lap joint at the aft end 116, or by other fabrication methods such that fiber ends are not present within the aft end 116. The aft end 116 may, for example, have a radius of at least 0.020 inches to create a structurally sound pressure vessel.

The core wrap 106 may also be woven, or otherwise tied into the skin 112 at end locations 118 and may have, for example, a radius of at least 0.020 inches. A core bridge 117 can be formed between end locations 118 to tie the core 102 to the skin 112. A fill material 119 such as ceramic composite or ceramic foam may be provided between the aft end location 118 and the aft end 116. The end locations 118 may, for example, have a radius of at least 0.020 inches to create a structurally sound pressure vessel. The core 102 may be made of, for example, glass, carbon, aramid, ceramic oxide, ceramic nitride, ceramic carbide, or a combination thereof.

A plurality of cooling holes 122 can be formed through the skin 112 of the airfoil 100 to provide fluid communication with the cooling fluid flow network 110. A cooling fluid represented by arrow 200 flows through the cooling fluid flow network 110 and exits through the cooling holes 122 as will be described in more detail below.

Figure 3:
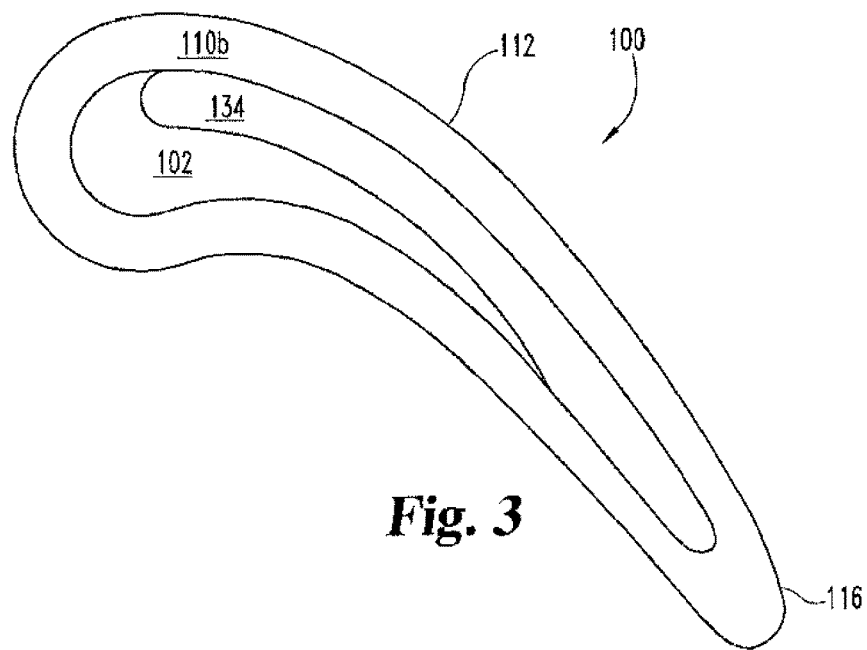

Referring now to FIG. 3, a cross-section of an alternate embodiment of the airfoil 100 is illustrated. In this exemplary embodiment, the shaped core 102 does not tie into the airfoil skin 112. Additionally, an optional ceramic tip 134 can be disposed on the airfoil 100 to provide protection from abrasion in a rotating environment when the airfoil can rub against a static portion of a static case (not shown) surrounding the rotating airfoil 100.

Figure 4:
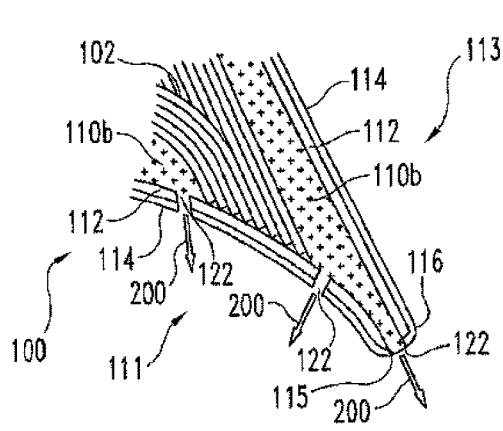
FIGS. 4 and 5 are cross-sectional views of end portions of airfoils according to alternate embodiments of the present disclosure.
Figure 5:
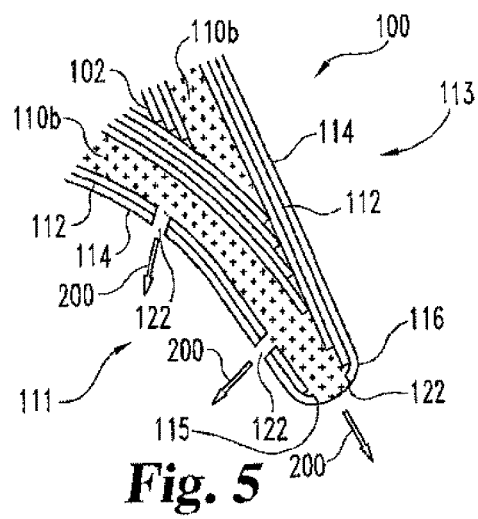

Referring now to FIGS. 4 and 5, cross sectional views of end portions 116 of alternate embodiments of exemplary airfoils 100 are shown. FIG. 4 shows an optional airfoil 100 design wherein the core 102 is tied the airfoil skin 112 proximate the pressure side 111 of the airfoil 100. FIG. 5 shows an optional airfoil 100 design wherein the core 102 is tied the airfoil skin 112 proximate the suction side 113 of the airfoil 100. With either configuration, cooling holes 122 can be formed in the skin 112 along the trailing edge 115 of the airfoils 100.

Figure 6:
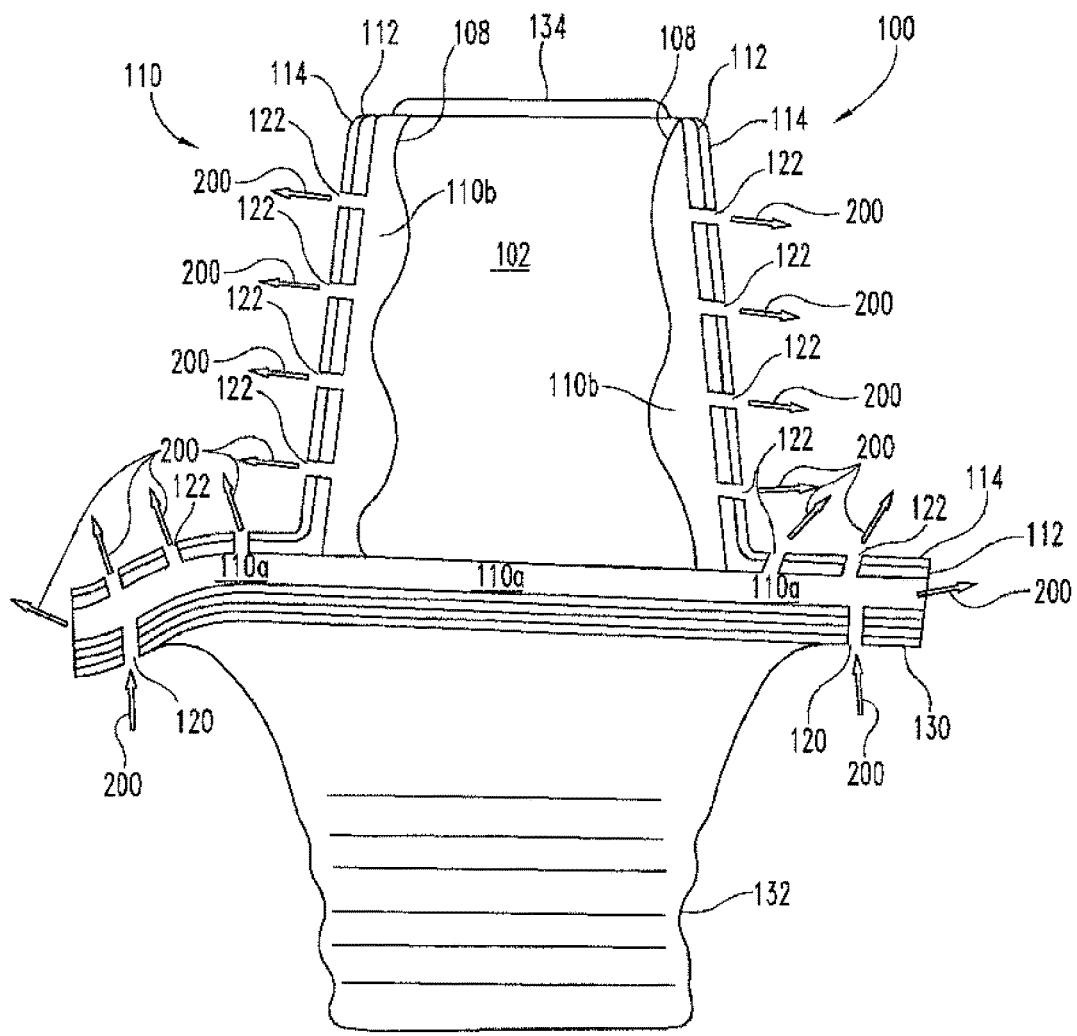
FIG. 6 is a side cross-sectional view of a blade according to an embodiment of the present disclosure.
Figure 7:
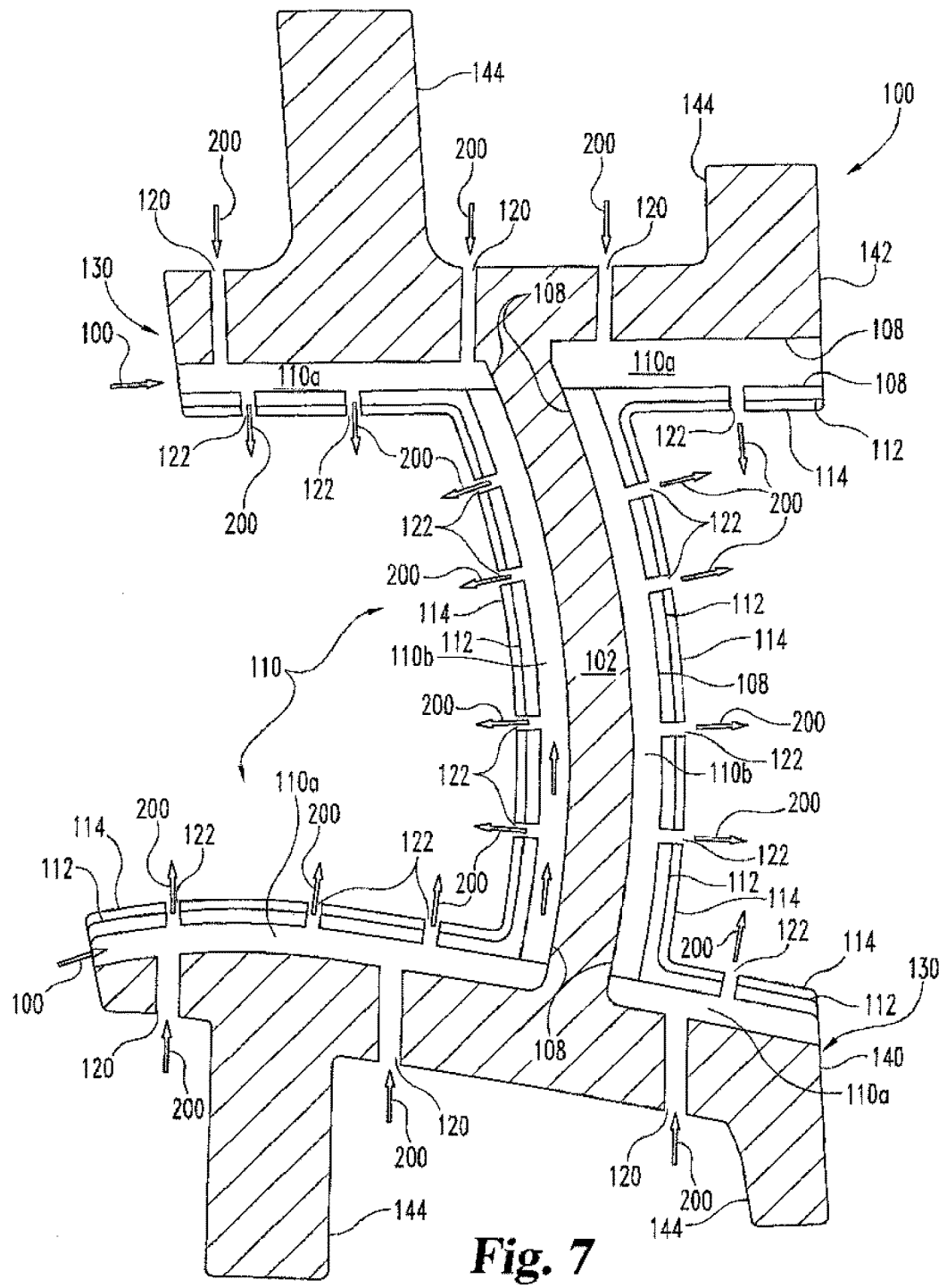
FIG. 7 is a side cross-sectional view of a vane according to an embodiment of the present disclosure.

With reference now to FIGS. 6 and 7, an airfoil 100 of the present disclosure is portrayed as a rotatable blade (FIG. 6) and a vane (FIG. 7). In each embodiment, a cooling fluid flow network 110 including of a first plurality of ceramic foam components 110a and a second plurality of ceramic foam components are disposed to provide cooling fluid to the airfoil 100. Ceramic foam components 110a can be disposed along a platform 130 generally orthogonal to the longitudinal shaped preform core 102. Ceramic foam components 110b can be disposed about the longitudinal shaped preform core 102 of the airfoil 100. The first plurality of ceramic foam components 110a acts as an on-boarding conduit for receiving a flow of cooling fluid 200, such as air. The ceramic foam component 110a is fluidly coupled to the ceramic foam components 110b such that in combination they define the cooling fluid network 110 and are operable to provide cooling fluid flow to desired locations within the airfoil 100. The ceramic foam components 110a and 110b may be formed of separate subcomponents that may or may not be bonded together. Alternatively, the ceramic foam components 110a and 110b can be formed as a single component.

Separators 108 made of, for example, fully dense plies of ceramic based material layers may be disposed in predefined locations so as to prevent cooling fluid flow from passing into or out of certain regions of the airfoil 100. The separators 108 may be disposed at least partially between the ceramic foam components 110a and 110b. The separators 108 can eliminate or control fluid communication between ceramic foam component 110a and 110b or between subcomponents formed within the ceramic foam components 110a and 110b.

A lamina airfoil skin 112 can be configured to envelope the longitudinal shaped preform core 102 and the ceramic foam components 110a, 110b. The lamina airfoil skin can be formed from a single ceramic composite layer that covers both the pressure side surface 111 and the suction side surface 113 of the airfoil 100.

Referring specifically to FIG. 6, an exemplary airfoil 100 is illustrated in the form of a blade with an attached platform 130, an attachment structure 132, such as a dovetail or multi-lobe "fir tree" design, and a ceramic tip 134 for possible abrasion against a blade track or seal (not shown). A compliant component (not shown) may also be provided as part of an interface with a disk (not shown). The platform may be formed from a multi-ply CMC layup. The illustrated embodiment is provided with feed holes 120 on the underside of the platform 130, piercing the platform 130 to form a fluid path to the ceramic foam component 110a as a means for on-boarding cooling fluids 200 into the cooling fluid flow network 110. Cooling holes 122 may be provided on the gas path surface of the platform 130. For example, the cooling holes 122 pierce through the airfoil skin 112 and coating 114 to the ceramic foam component 110a. Providing cooling fluid 200 to the airfoil 100 via the platform 130 eliminates the need for pathways that may otherwise be placed in highly loaded and highly stressed regions of the attachment 132. A plurality of cooling holes 122 may be provided along the airfoil pressure and suction side surfaces 111, 113 (shown best in FIG. 2) of the airfoil 100.

With specific reference to FIG. 7, an exemplary airfoil 100 is illustrated in the form of a vane with a platform 130 attached to opposing endwalls 140 and 142. The endwalls 140, 142 may be disposed laterally from the vane 100 and can be constructed with attachment flanges 144 to connect the vane to support structure (not shown). The exemplary embodiment provides for a ceramic foam component 110a positioned within the platforms 130 of the endwalls 140, 142. Coolant feed holes 120 can be provided on the underside of the endwalls 140, 142, piercing through the endwall structure to the cooling fluid network 110 as a means for on-boarding a flow of cooling fluid 200. Cooling holes 122 may further be provided along the pressure and suction side surfaces 111, 113 of the airfoil 100 and along a length of the platforms of the endwalls 140, 142. Cooling fluid 200 can be on-boarded into the cooling fluid network 110 by flowing through the ceramic foam components 110a proximate the platforms 130 and fed to the ceramic foam components 110b positioned internal to the airfoil 100. The cooling fluid flow 200 can then be ejected out of the cooling holes 122 formed in the platform 130 and airfoil 100. On-boarding the cooling fluid 200 through feed holes 120 formed in the underside of the endwalls 140, 142 eliminates the need to create cooling fluid pathways through the core 102 of the airfoils 110 and thereby minimize the creation of areas of high stress concentration.

Utilizing a supply of cooling fluid 200 from both endwalls provides a variety of cooling options. For example, the airfoil 100 may be cooled by both endwalls having the same or differing pressures and/or temperatures. In another example, one endwall may provide cooling fluid 200 to just the leading edge of the airfoil 100, while the other endwall may provide cooling fluid 200 to other portions of the airfoil 100. In yet another example, cooling fluid pathways formed within the cooling fluid flow network 110 may intersect and be redundantly fed from both end walls 140, 142.

Figure 8:
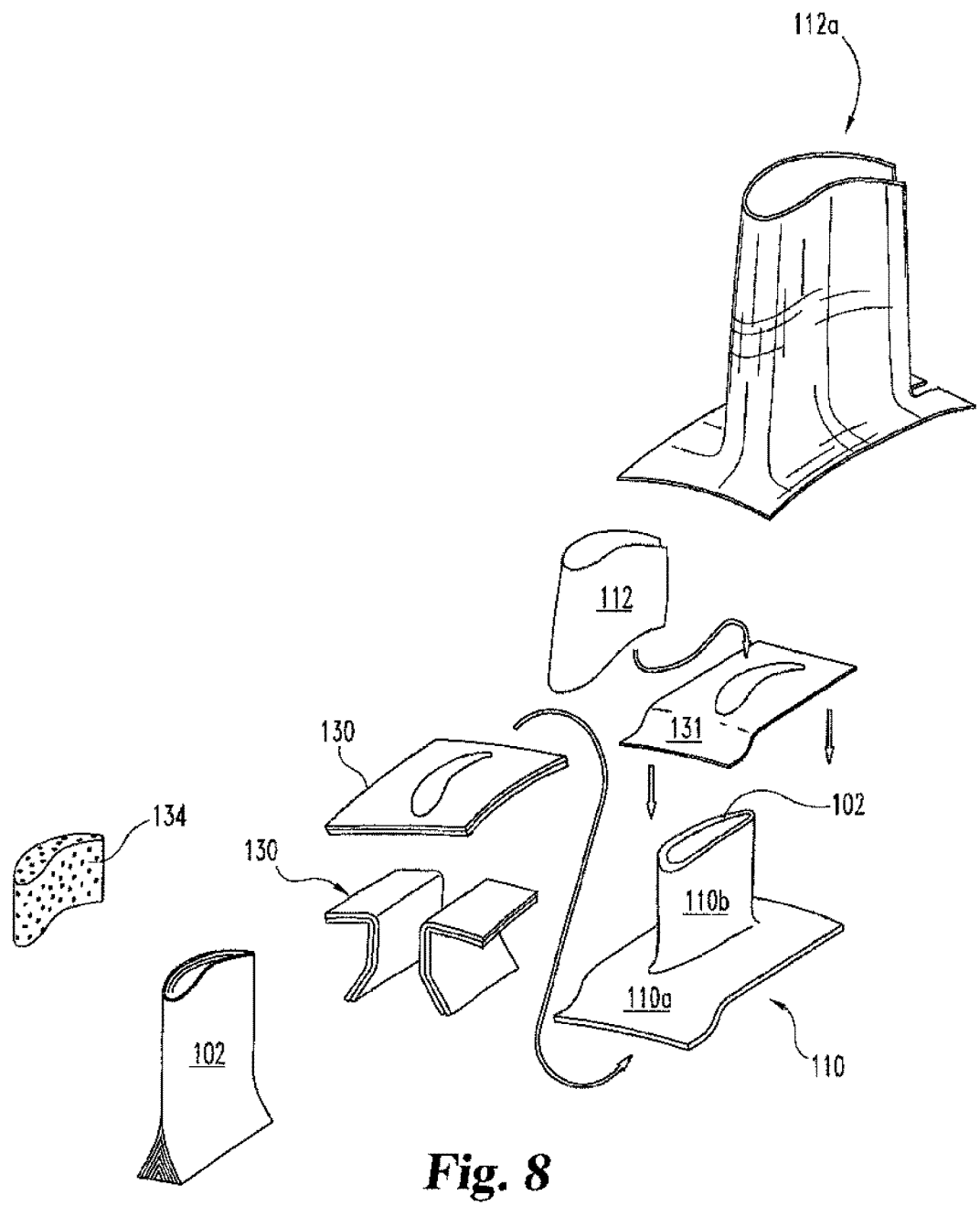
FIGS. 8 and 9 are exploded assembly views of embodiments of the present disclosure.

Referring now to FIG. 8, an example assembly method is shown for a blade having a platform 130. An airfoil core 102 may first be formed as generally having the attributes described herein. A laminate platform 130 is created in similar fashion and attached to the airfoil core 102. The cooling fluid flow network 110 may be formed of a first plurality of ceramic foam components 110a disposed within the platform 130 and a second plurality of ceramic foam components 110b disposed about the airfoil core 102. The ceramic foam components 110a and 110b can be in fluid communication with one another to form the cooling fluid flow network 110. The cooling fluid flow network 110 may be provided as a single pre-formed and/or pre-machined ceramic foam component, or as multiple ceramic foam components fluidly coupled to one another. A platform gas path ply 131 may be added to the topside of the ceramic foam component 110a. The airfoil skin 112 may then be disposed about the ceramic foam component 110b. After assembling the various components of the blade, processing can be completed by a variety means such as chemical vapor infiltration, chemical vapor deposition, or a combination thereof. One or more coatings along with cooling holes can then be applied to the airfoil 100. In an alternative embodiment to a two-piece airfoil skin 112 and platform gas path ply 131, a single piece three-dimensional woven airfoil and platform sock 112a may be provided and disposed about the ceramic foam components 110a, 110b. A ceramic tip 134 may additionally be added to the airfoil 100 for certain applications.

Figure 9:
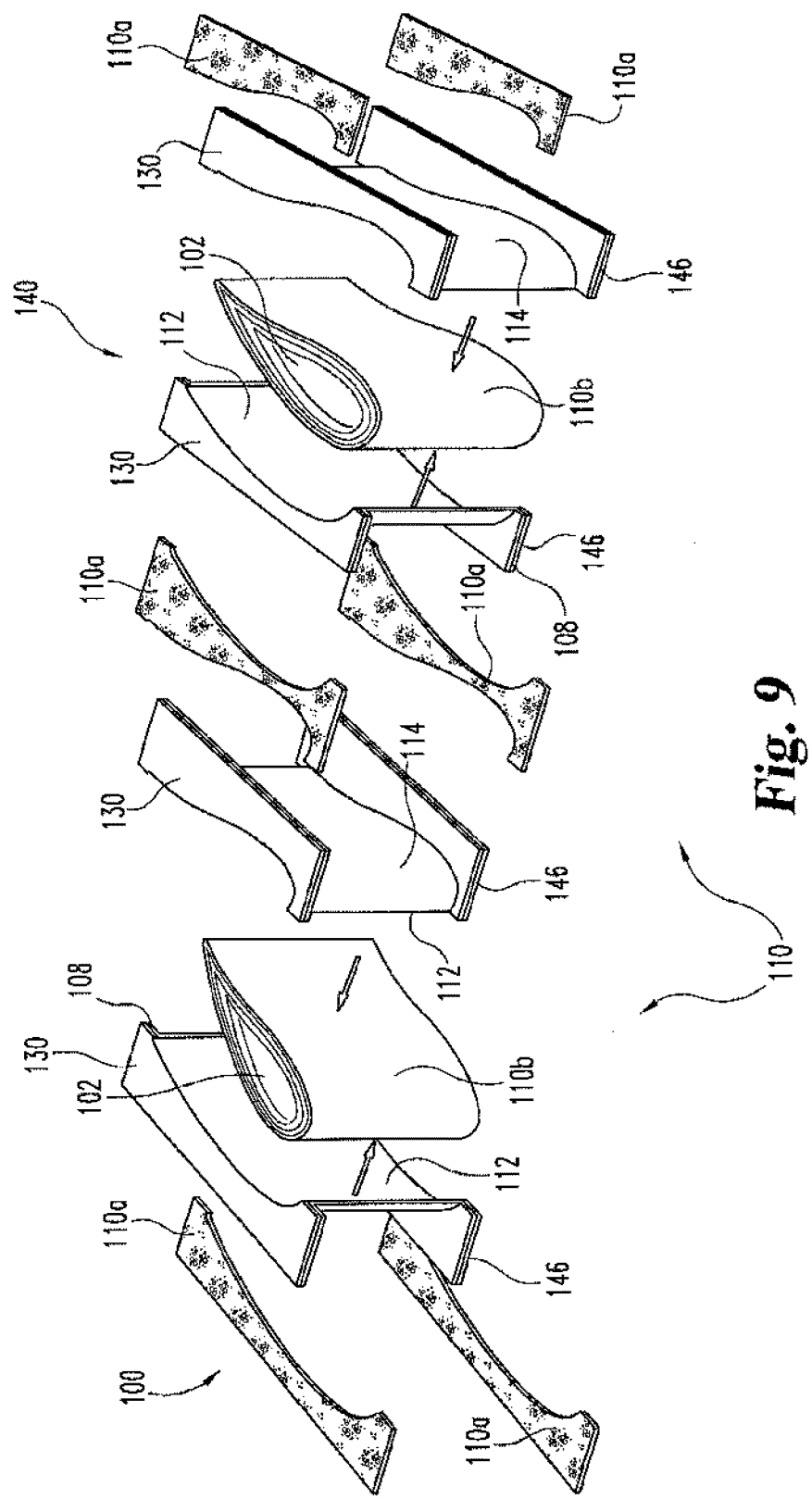

Referring now to FIG. 9, an exploded view showing an assembly diagram for an airfoil 100 in the form of a vane with endwalls 140, 142 is illustrated. An airfoil core 102 may first be formed as generally having the attributes described above. A plurality of ceramic foam components 110b may be disposed about the core 102 with one or more separators 108 placed to prevent cooling fluid from moving to certain predefined regions of the airfoil 100. The ceramic foam components 110b may be pre-formed and/or pre-machined to a desired configuration or alternatively machined or otherwise formed after assembly. An airfoil skin 112 may be positioned over the ceramic foam components 110b and the core 102. The ceramic foam components 110a may be positioned within the platforms 130 of the endwalls 140, 142. The platforms 130 may be reinforced by a plurality of ceramic composite lamina layers 146. Airfoil skins 112 may be joined with the endwalls 140, 142 prior to assembly with the ceramic foam components 110b. After assembling the various components of the vane, processing can be completed by a variety means such as chemical vapor infiltration, chemical vapor deposition, or a combination thereof. One or more coatings along with cooling holes may be added to the airfoil 100 as desired.

One aspect of the present disclosure includes a ceramic matrix composite airfoil comprising: a shaped core formed of a plurality of ceramic composite plies; a cooling fluid flow network formed of one or more ceramic foam components at least partially positioned around the shaped core; an airfoil skin formed of a ceramic fiber lamina disposed about the shaped core and the cooling fluid flow network.

Refinements to the present disclosure include the airfoil skin being formed of a single ceramic fiber lamina; a rotatable blade formed from the ceramic composite airfoil; a platform connected to the rotatable blade; at least one ceramic foam component positioned within the platform; wherein the at least one ceramic foam component positioned in the blade platform is fluidly connected to the one or more ceramic foam components positioned around the shaped core; a vane having at least one endwall and a platform with at least one ceramic foam component positioned therein; wherein the at least one ceramic foam component of the vane platform is fluidly connected to the one or more ceramic foam components positioned around the shaped core; at least one separator positioned within the fluid flow network to restrict cooling fluid flow into defined regions of the airfoil; wherein the airfoil skin is impervious to fluid flow; wherein the shaped core and the airfoil skin includes at least one material selected from the group comprising glass, carbon, aramid, ceramic oxide, ceramic nitride, and ceramic carbide; and wherein the cooling fluid flow network comprises at least one material selected from the group including metals, metal alloys, silicon carbide, and silicon/silicon carbide.

Another aspect of the present disclosure includes an apparatus comprising: a gas turbine engine comprising a ceramic matrix composite airfoil suitable for operational use in an internal operating environment of the gas turbine engine; the ceramic matrix composite airfoil comprising: a longitudinal shaped preform core; a cooling fluid flow network having a plurality of ceramic foam components disposed about the shaped preform core; a single lamina airfoil skin enveloping the longitudinal shaped preform core and the cooling fluid flow network; and an on-boarding member having an internal ceramic foam component connected to a portion of the airfoil, wherein the internal ceramic foam component is in fluid communication with the ceramic foam components disposed about the shaped preform core.

While the invention has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," "joined," and "coupled" and variations thereof are used broadly and encompass both direct and indirect mountings, connections, supports, and couplings. Further, "connected" and "coupled" are not restricted to physical or mechanical connections or couplings.

What is claimed is:

1. A ceramic matrix composite airfoil comprising:
    a longitudinal shaped laminate core comprising a core wrap formed of a plurality of ceramic composite plies,
    a cooling fluid flow network formed of one or more ceramic foam components at least partially positioned around the longitudinal shaped laminate core;
    an airfoil skin formed of a ceramic fiber lamina disposed about the longitudinal shaped laminate core and the cooling fluid flow network;
    a rotatable blade formed from the ceramic composite airfoil;
    a blade platform connected to the rotatable blade; and
    at least one ceramic foam component positioned within the blade platform,
    wherein the at least one ceramic foam component positioned in the blade platform is fluidly connected to the one or more ceramic foam components positioned around the longitudinal shaped laminate core, and
    wherein the at least one ceramic foam component positioned in the blade platform is generally orthogonal to the one or more ceramic foam components positioned around the longitudinal shaped laminate core.

2. The ceramic matrix composite airfoil of claim 1, wherein the airfoil skin is formed of a single ceramic fiber lamina.

3. A ceramic matrix composite airfoil comprising:
    a longitudinal shaped laminate core comprising a core wrap formed of a plurality of ceramic composite plies,
    a cooling fluid flow network formed of one or more ceramic foam components at least partially positioned around the longitudinal shaped laminate core;
    an airfoil skin formed of a ceramic fiber lamina disposed about the longitudinal shaped laminate core and the cooling fluid flow network;
    a vane formed from the ceramic composite airfoil having at least one endwall and a platform with at least one ceramic foam component positioned therein,
    wherein the at least one ceramic foam component of the vane platform is fluidly connected to the one or more ceramic foam components positioned around the longitudinal shaped laminate core, and
    wherein the at least one ceramic foam component of the vane platform is generally orthogonal to the one or more ceramic foam components positioned around the longitudinal shaped laminate core.

4. The ceramic matrix composite airfoil of claim 1, further comprising:
    at least one separator positioned within the fluid flow network to restrict cooling fluid from flowing into defined regions of the airfoil.

5. The ceramic matrix composite airfoil of claim 1, wherein the airfoil skin is formed to include a plurality of cooling holes.

6. The ceramic matrix composite airfoil of claim 1, wherein the longitudinal shaped laminate core and the airfoil skin includes at least one material selected from the group comprising glass, carbon, aramid, ceramic oxide, ceramic nitride, and ceramic carbide.

7. The apparatus of claim 5, wherein the cooling fluid flow is in fluid communication with the plurality of cooling holes.

8. An apparatus comprising:
    a gas turbine engine comprising a ceramic matrix composite airfoil suitable for operational use in an internal operating environment of the gas turbine engine;
    the ceramic matrix composite airfoil comprising:
    a longitudinal shaped preform core comprising a core wrap formed of a plurality of ceramic composite plies;
    a cooling fluid flow network having a plurality of ceramic foam components disposed about the longitudinal shaped preform core;
    a single lamina airfoil skin enveloping the longitudinal shaped preform core and the cooling fluid flow network; and an on-boarding member having an internal ceramic foam component connected to a portion of the airfoil, wherein the internal ceramic foam component is in fluid communication with the ceramic foam components disposed about the longitudinal shaped preform core, wherein the ceramic foam component of the on-boarding member is generally orthogonal to the ceramic foam components disposed about the longitudinal shaped preform core.

9. The apparatus of claim 8, wherein the on-boarding member is one of a rotatable blade platform and a vane endwall platform.

10. The apparatus of claim 8 further comprising:
a plurality of cooling holes formed through the skin of the airfoil configured to provide fluid communication with the cooling fluid flow network.

11. The apparatus of claim 8, wherein the on-boarding member includes a passageway to receive cooling fluid from a cooling fluid source.

12. A method comprising:
providing a gas turbine engine and producing an airfoil within the gas turbine engine by:
supplying a longitudinal shaped core comprising a core wrap formed of a plurality of ceramic composite plies;
creating a cooling fluid flow network formed of one or more ceramic foam components at least partially positioned around the longitudinal shaped core;
disposing an airfoil skin made of ceramic fiber fabric about the longitudinal shaped core and the cooling fluid flow network; and
fluidly coupling an on-boarding member to the cooling fluid flow network,
wherein the on-boarding member has an internal ceramic foam component connected to a portion of the airfoil, wherein the internal ceramic foam component is in fluid communication with the ceramic foam components disposed about the longitudinal shaped core, and
wherein the ceramic foam component of the on-boarding member is generally orthogonal to the ceramic foam components disposed about the longitudinal shaped core.

13. The method of claim 12, further comprising:
piercing apertures through the airfoil skin; and
fluidly connecting the apertures to the cooling fluid flow network.

14. The method of claim 12, further comprising:
supplying cooling fluid to the on-boarding member.

15. The method of claim 12, wherein the airfoil skin comprises a structurally sound pressure vessel.

16. The method of claim 12, further comprising:
applying a thermal barrier coating and/or an environmental barrier coating to the skin of the airfoil.

17. The method of claim 12, further comprising:
processing at least a portion of the ceramic composite airfoil with one of chemical vapor infiltration and chemical vapor deposition.

* * * * *